United States Patent Office 3,365,411
Patented Jan. 23, 1968

3,365,411
COATING COMPOSITION CONTAINING A BLEND OF MODIFIED POLYBUTADIENES
Joseph K. Mertzweiller and Marnell Allein Segura, Baton Rouge, and Neville L. Cull, Baker, La., assignors to Esso Research and Engineering Company, a corporation of Delaware
No Drawing. Filed Oct. 6, 1965, Ser. No. 493,542
9 Claims. (Cl. 260—29.7)

This invention relates to a novel coating composition and more specifically relates to a blend of (1) a polymeric half ester of a hydroxylated polymer and a saturated or unsaturated polycarboxylic acid or anhydride or its amination product with (2) a polymeric adduct of a polymer or copolymer of a conjugated diolefin and an unsaturated polycarboxylic acid anhydride or its amination product.

It is known that liquid polymer oils can be prepared by polymerizing conjugated diolefins such as butadiene, isoprene, piperylene, etc. or by copolymerizing these diolefins with vinyl aromatic hydrocarbons, such as styrene and the like. The process is carried out by mass polymerization in the presence of organometallic solutions, alkali-metal dispersions, e.g. sodium dispersions, or peroxides by emulsion polymerization and the like. Such oils when dissolved in an equal quantity of hydrocarbon solvent, such as mineral spirits, generally have a viscosity between 0.1 and 20 poises or about 1 to 20,000 poises when diluent free. These oils are particularly useful as protective coatings in the form of colorless varnishes or enamels and may be either air-dried or baked. Details for the preparation of these polymers may be found in U.S. Patent No. 2,500,983 to Frolich; U.S. Patent No. 2,586,594 to Arundale; U.S. Patent No. 2,581,094 to Gleason et al.; U.S. Patent No. 2,762,851 to Gleason; U.S. Patent No. 2,849,510 to Jaros et al. and U.S. Patent No. 2,993,050 to Gleason et al. These patents are incorporated herein by reference to complete the disclosure.

The pigment wetting properties of these polymers may be improved by reacting the polymer with .01 to 2.5% of a polycarboxylic acid anhydride such as maleic anhydride at 50 to 250° C. in accordance with the teachings of Gleason in U.S. Patent No. 2,652,342. However, up to 50 wt. percent of polycarboxylic acid anhydride can be incorporated in these polymers by carrying out the adduct formation in the presence of water or other means to minimize the presence of peroxides, as described in copending application of Neville L. Cull and Joseph K. Mertzweiller, Ser. No. 493,542, filed Oct. 6, 1965. The hardness of the films of these polycarboxylic acid anhydride adducts can be improved by reacting them with various amines as described in U.S. Patent No. 2,856,309 to Gleason et al. While the amine derivatives of these adducts form films having improved properties, the cure rates have been found to be only fair and the flexibility and impact properties of these films are only fair to poor.

It has now been found that the flexibility and impact properties and cure rates of the films prepared from the above adducts or their aminated products can be improved without affecting their hardness by blending these adducts with the half esters or their amination products formed by the esterification of hydroxylated polymers with polycarboxylic acids or anhydrides thereof. The cure rates of the amination products of the blend are faster than for either resin alone, particularly at film thicknesses in the range of one mil. Such improvement is accomplished by blending from about 25 to 75 parts by weight of the polymeric half-ester or its amination product with 75 to 25 parts by weight of the polymeric adduct or its amination product. The blending can be accomplished either before or after amination.

The term amination product is taken to mean the reaction of the carboxyl and/or anhydride groups present in the above defined polymers with at least the stoichiometric quantities of ammonia and/or amines to form the corresponding amine and/or amine amide salts. The total functionality is normally sufficient such that the resulting amination products are substantially or completely soluble in water. If desired lower alkyl half esters of the direct adduct may be formed and the remaining carboxyl functionality reacted with the amine or ammonia. Thus the adduct may be reacted with just the stoichiometric amount of an alcohol such as methanol, ethanol, propanol or the like and the resulting half ester then reacted with the amine or ammonia. The resulting polymer blends of this invention are particularly suited for use in aqueous solutions as protective coatings on metal or other surfaces, which coatings may be applied by any conventional means including electrophoretic deposition.

Illustrative of the preparation of the unsaturated polycarboxylic anhydride adduct of the diolefin polymers which fall within the purview of this invention, the above described liquid polymers of diolefins or copolymers of diolefins with vinyl aromatic hydrocarbons are reacted with an unsaturated polycarboxylic acid anhydride, e.g. maleic anhydride, citraconic anhydride, itaconic anhydride, glutaconic anhydride, chloromaleic anhydride, methyl maleic anhydride, mesaconic anhydride, etc. While these reagents may be added in any amount up to incipient gelation, amounts between 10 and 50 wt. percent are generally suitable. The reaction is carried out at a temperature between 50 and 250° C., preferably between 180 and 220° C. The necessary time for such treatment varies between about fifteen minutes and two hours depending on the temperatures employed. A structure of the adduct can be schematically represented by the following when the anhydride introduced is maleic.

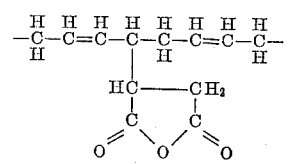

Only allylic hydrogens are shown on the polymer back bone since it is felt that these are the sites for addition.

In the preparation of the second component of the blends of this invention, that is the half esters of the hydroxylated polymers, the liquid polymers of diolefins or copolymers of diolefins with vinyl aromatic hydrocarbons are hydroxylated in an inert hydrocarbon medium which may be either paraffinic or aromatic type solvents, the latter being preferred. However, a diluent is not necessary. The hydroxylation is accomplished by intimately contacting the diolefin polymer with carbon monoxide and hydrogen in the presence of any suitable oxo catalyst in two stages in the first stage of which conditions are set to maximize oxonation and minimize hydrogenation of the starting polymer, followed by a second stage operating under hydrogenation conditions.

The first stage reaction may be performed at pressures of from 300 to 3000 p.s.i.g., preferably at pressures of from 500 to 1500 p.s.i.g. The temperatures are maintained in the range of from 110 to 220° C., preferably from 150 to 200° C. The reaction time is from twenty minutes to five hours, preferably from one to three hours. The molar ratio of hydrogen to carbon monoxide is not particularly critical and may be between 1:1 to 10:1, however ratios higher than 3:1 give no particular advantage. The conditions of the first stage yield primarily aldehydic products.

These aldehydic products are then submitted to a rapid hydrogenation whereby not only the aldehyde groups but also most of the residual unsaturation in the polymer chain is hydrogenated. This hydrogenation may be achieved by either of two methods. With a conventional oxo catalyst such as $Co_2(CO)_8$ the product may be freed of soluble cobalt by any conventional cobalt removal process, (e.g., thermal decomposition, extraction with acid etc.) and the cobalt free product may then be hydrogenated over any suitable hydrogenation catalyst such as Raney nickel, nickel on supports (e.g., Ni on kieselguhr), copper chromite, molybdenum sulfide on suitable supports (carbon, alumina), cobalt molybdate, etc. Specific hydrogenation conditions will depend on the catalyst but will generally fall within the range of 50–250° C. in temperature and 500–3000 p.s.i.g. hydrogen pressure with sufficient reaction time to hydrogenate the carbonyl and unsaturated linkages substantially to completion. This method of preparing hydroxylated polymers suffers from the deficiency that the $Co_2(CO)_8$ oxo catalyst limits the molecular weight of the starting (diolefin) polymer to the range of about 300–2000 because its acidic nature tends to cross-link polymers of higher molecular weight.

This limitation may be overcome by using less acidic oxo catalysts of the type described below. These complex metal carbonyl catalysts are also much more stable than $Co_2(CO)_8$ and can be used for hydrogenation as well as for oxonation. It is necessary, however, to avoid conversion of the catalyst complex to the free metal. This is accomplished by retaining sufficient carbon monoxide partial pressure, for example, about 10 to 500 p.s.i.g., preferably about 30 to 90 p.s.i.g. to stabilize the system. Total pressures in the second stage may range from 100 to 3000 p.s.i.g., preferably between 1000 and 1500 p.s.i.g. The temperature may range from 160° to 230° C., preferably 190 to 215° C. The reaction time is between 0.5 and six hours, preferably between one and two hours.

The same catalyst is used in both stages and in general can be represented by the following formulas:

(1) $\qquad [M_2(CO)_6(BR_3)_2]$ or (2) $\qquad [R'M(CO)_y(BR_3)]_x$ where M is a transitional metal and may be iron, cobalt, or rhodium, preferably cobalt; B is a group VA element which may be either phosphorus or arsenic, preferably phosphorus, R is an alkyl or alkoxy radical containing from 1 to twenty, preferably one to six carbon atoms, R' is a conjugated diolefin or allylic moiety containing three to six carbon atoms and bound to the metal atom by pi and sigma bonding; x is one or two and y is one or two with the proviso that when x is one then y is two and vice versa. Preparation of these complexes is more fully described in copending applications, Ser. No. 256,258 and Ser. No. 256,260 of Mertzweiller and Tenney, both filed Feb. 5, 1963. The preparation of the hydroxylated polymer is more fully disclosed in Ser. No. 307,359, filed Sept. 9, 1963 for Cull, Mertzweiller and Tenney. For completion of the disclosure, the disclosures of these applications are included herein by reference without in any way restricting the scope of the instant application.

The above produced hydroxylated polymer is then reacted with 1 to 50 wt. percent, preferably 25 to 40 wt. percent of a saturated or unsaturated polycarboxylic acid or an anhydride thereof. Suitable acids and anhydrides contain about 2 to 20 carbon atoms, preferably 4 to 10 carbon atoms. The number of carboxyl radicals contained in the acids or anhydrides may vary from two to six with two to four being the preferred number. Suitable compounds include succinic, phthalic, chlorosuccinic, chlorendic, tetrapropenyl succinic, maleic, citraconic, itaconic, glutaconic, methyl maleic, chloromaleic and the like. The reaction temperature is maintained between 25 and 200° C., preferably between 25 and 135° C. The reaction time may vary between about fifteen minutes and three hours. The resulting half ester may be represented as having the following structure when maleic acid is used:

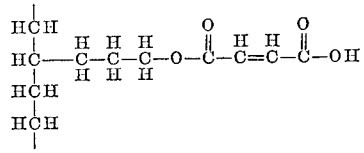

The number of ester side chains will depend upon the degree of hydroxylation and the amount of maleic acid introduced.

The above half ester is blended with the polycarboxylic anhydride adduct in the ratio of 25 to 75 parts by weight of the adduct to 75 to 25 parts by weight of the half ester.

Blending of the two can be accomplished by mixing solutions of the polymer in a vessel provided with means for agitation and the like, the mixing being continued until a homogeneous composition is obtained. If desired the polymer blend can be recovered by precipitating it from solution by cooling or the solvent employed can be vaporized.

The blends can be used as coating compositions as such but they are preferably converted to water soluble products by reacting with a stoichiometric amount or a slight excess of a suitable amine or ammonium-containing compound, at temperatures of 10° to 65° C., preferably at 25° to 40° C., as described in Ser. No. 466,075, filed June 22, 1965, for Mertzweiller, included herein by reference. The individual components of the blend can be converted to the amine or ammonium salts separately and then blended, but it is preferable to blend the half ester with the adduct and then react the mixture with ammonia or an aliphatic amine or ammonium compound containing from 1 to 10, preferably 1 to 6 carbon atoms. Suitable amines include mono, di, and tri-methyl, ethyl, butyl, amyl, hexyl and the like amines, anhydrous or aqueous ammonia, various amine salts and the like.

While the amine or ammonium derivatives, prepared as described above, can be prepared from any molecular weight polymer, it is a particularly desirable feature of this invention to use those basic polymers having molecular weights between about 300 and 4,000 since the aminated derivatives are usually completely water soluble.

The following specific examples are presented to illustrate typical applications and effects of the present invention. All quantities are expressed in this specification and claims on a weight basis unless stated otherwise.

*Example 1*

A commercially prepared polybutadiene of about 900 number average molecular weight, and having about 60% of the unsaturation as pendant vinyl groups and 40% as cis and trans internal unsaturation was dissolved in toluene at room temperature (20–30° C.) to give a 40% solution. 1000 grams of this solution and 7.0 grams of the cobalt catalyst complex

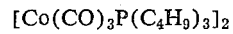

as a solution in 100 grams of toluene were charged to a 2-liter stirred autoclave. An oxo reaction was carried out at 175°–180° C., 1000–1100 p.s.i.g. of synthesis gas (about 1.4/1 $H_2$/CO ratio) for fifty minutes. Total gas absorbed amounted to 1700 p.s.i.g. The product was then treated with a synthesis gas composition in the range of 15–20/1 volume ratio of $H_2$/CO at 195–200° C., 1400–1500 p.s.i.g. for eighty-five minutes. Gas absorption amounted to 1500 p.s.i.g. The homogeneous liquid product had a resin content (non-volatile materials) of 40.2 wt. percent and contained 0.0965% cobalt in solution. The oxygen content based on pure resin was 7.2 wt. percent as measured by neutron activation. The cobalt content was reduced to 0.012 wt. percent by treating 700 grams with 7 grams of 10% $H_3PO_4$ solution at 120° C. for one hour followed by filtration. Infrared spectrophotometric examination showed very strong absorption evidencing the presence of —OH groups.

The solution of this resin (1134 grams) was mixed with maleic anhydride (181 grams) and heated under reflux for 1.5 hours. The product was filtered and stripped free of the toluene solvent.

About 467 grams of the resulting half ester were mixed with about 139 grams of triethyl amine. A pale yellow resin forming a clear, pale yellow solution in water was obtained.

*Example 2*

A maleic anhydride adduct of a polybutadiene having a molecular weight of 450 and having one terminal benzyl group (chain transfer function) was prepared by heating it for two hours at 200° C. with 20% by weight of maleic anhydride. 100 grams of this adduct were hydrolyzed with water, then treated with 30 grams of triethyl amine to give a product completely soluble in water.

*Example 3*

Equal volumes of the polymers of Examples 1 and 2 were blended and films thereof were laid down on Q panels and baked for thirty minutes at 150° C. and compared with similar films laid down from the polymers separately. The following data were obtained:

| Resin | Example 1 | | Example 2 | | Blend | |
|---|---|---|---|---|---|---|
| Thickness, mils | 0.45 | 0.8 | 0.5 | 0.9 | 0.45 | 0.9 |
| Pencil Hardness | 7H | F | 5H | HB | 5H | 5H |
| ⅛″ Flex. Mandrel | Pass | Pass | Fail | Fail | Pass | Pass |
| Impact, lbs: | | | | | | |
| Direct | 160 | 160 | 30 | <5 | 60 | 40 |
| Reverse | 160 | 160 | <5 | <5 | 60 | 5 |

The above data show that for the same curing time (thirty minutes at 150° C.) harder films were obtained for the blend as compared to the individual resins, particularly with the thicker films, while at the same time the flexibility and impact properties were not drastically impaired.

*Example 4*

A polybutadiene of 900 number average molecular weight (containing about 50 p.p.m. peroxide oxygen) was converted to its maleic anhydride adduct by reacting 500 grams of its polymer in 500 grams benzene with 200 grams maleic anhydride and 2 grams water in a 2-liter stirred autoclave. The reaction was carried out at 190–200° C. for three hours. The filtered product was a clear yellow solution having a viscosity of 1.6 stokes. A portion of this was freed of solvent for use in Example 6.

*Example 5*

Blends were prepared using the polymer solution of Example 4 and a toluene solution of the maleic partial ester of a polymer prepared under conditions essentially the same as those used in Example 1 (the solution was not stripped to remove solvent). This latter solution had a resin content (NVM) of 49 wt. percent and the resin (solvent free) had an acid number of 172.

The various blends of these polymers (the respective solutions were blended to give the polymer concentration shown below) were coated on Q panels and bake cured at 150° C. for thirty minutes. The following were the properties of the various blend compositions:

TABLE I

| Blend No. | Composition of— | | Film Thickness, Mils | Pencil Hardness | Flex. ⅛″ Mandrel | Impact in lbs. | |
| | Maleic half ester of hydroxylated polybutadiene | Maleic anhydride adduct of polybutadiene | | | | Dir. | Rev. |
|---|---|---|---|---|---|---|---|
| A | 100 | | 1.4 | HB | Pass | 160 | 160 |
| B | 75 | 25 | 1.4 | HB | do | 160 | 120 |
| C | 50 | 50 | 1.4 | HB | do | 160 | 100 |
| D | 25 | 75 | 1.4 | H | do | 80 | 20 |
| E | | 100 | 1.4 | H | Fail | 10 | <5 |

The above results show that in a more conventional solvent based system it is possible to achieve reasonable impact and flex properties in the film using as little as 25% of the maleic half ester resin based on the direct adduct resin. The results here, however, are not as striking as in the aqueous system.

*Example 6*

The advantages of the aqueous system in providing outstanding impact and flexibility properties with reasonable cure rates at fairly low cure temperatures are illustrated in the following table. Blends were prepared from (1) aqueous solution of triethyl amine salts of the maleic partial ester of a polymer prepared under the conditions of Example 1 and (2) aqueous solutions of the triethylamine salt of the ethyl partial ester of the direct maleic anhydride adduct of polybutadiene obtained by first treating the solvent-free polymer of Example 4 with the stoichiometric amount of anhydrous ethanol to give the partial ester and then neutralizing the remaining carboxyl functionality with triethylamine. These blends were coated on Q panels and baked at 150° C. for thirty minutes. The following data were obtained.

TABLE II

| Blend | Composition of Aqueous Solution | | Film thickness, mils | Pencil Hardness | Flex. ⅛″ Mandrel | Impact in lbs. | |
| | Triethylamine salts of maleic partial ester of Example 1 | Triethylamine salts of ethyl partial ester of Example 4 | | | | Dir. | Rev. |
|---|---|---|---|---|---|---|---|
| A | 100 | | 1.0 | HB | Pass | 160 | 160 |
| B | 90 | 10 | 1.0 | HB | do | 160 | 160 |
| C | 75 | 25 | 0.9 | H | do | 160 | 160 |
| D | 50 | 50 | 0.9 | H | do | 160 | 130 |
| E | | 100 | 1.0 | H | Fail | 20 | <5 |

The nature of the present invention having thus been fully set forth and specific examples of the same given, what is claimed as new and useful and unobvious and desired to be secured by Letters Patent is:

1. A coating composition comprising a mixture of (A) 25 to 75 parts by weight of the reaction product of ammonia or a $C_1$ to $C_{10}$ aliphatic amine with the adduct of an unsaturated polycarboxylic acid anhydride and a homopolymer of a conjugated diolefin of 4 to 6 carbon atoms or a copolymer thereof with a vinyl aromatic hydrocarbon and (B) 75 to 25 parts by weight of the reaction product of ammonia or a $C_1$ to $C_{10}$ aliphatic amine with a poly carboxylic acid or anhydride half ester of a hydroxylated homopolymer of a conjugated diolefin of 4 to 6 carbon atoms or a copolymer thereof with a vinyl aromatic hydrocarbon.

2. The coating composition of claim 1 in which the aliphatic amines of (A) and (B) are each triethyl amine and the polymers of (A) and (B) are each polybutadiene having a molecular weight between 300 and 4000.

3. The coating composition of claim 1 in which the unsaturated polycarboxylic acid anhydride of (A) is maleic anhydride and the polycarboxylic acid or anhydride of (B) is maleic anhydride.

4. The coating composition of claim 3 in aqueous solution.

5. The coating composition of claim 3 in hydrocarbon solution.

6. The coating composition of claim 1 in which (A) is the reaction product of ammonia or a $C_1$ to $C_{10}$ aliphatic amine with the lower alkyl half ester of the adduct of an unsaturated polycarboxylic acid anhydride and a homopolymer of a conjugated diolefin of 4 to 6 carbon atoms or a copolymer thereof with a vinyl aromatic hydrocarbon and (B) 75 to 25 parts by weight of the reaction product of ammonia or a $C_1$ to $C_{10}$ aliphatic amine with a polycarboxylic acid or anhydride half ester of a hydroxylated homopolymer of a conjugated diolefin of 4 to 6 carbon atoms of a copolymer thereof with a vinyl aromatic hydrocarbon.

7. The coating composition of claim 6 in which the lower alkyl is ethyl.

8. The coating composition of claim 1 in which the adduct of (A) is polybutadiene containing a plurality of segments each having the following structure

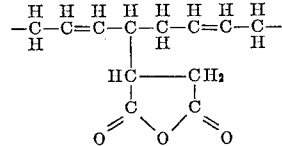

and the half ester of (B) is polybutadiene containing a plurality of segments each having the following structure

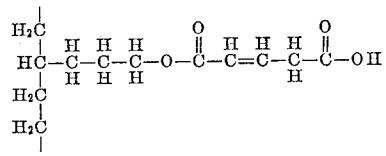

9. The coating composition of claim 4 in which the aliphatic amines of (A) and (B) are each triethyl amine.

References Cited

UNITED STATES PATENTS 2,956,309  10/1958  Gleason et al. _____ 260—85.1

GEORGE F. LESMES, *Primary Examiner.*

W. J. BRIGGS, SR., *Assistant Examiner.*